ACTIVE ELEMENT WORD DRIVER USING SATURABLE CORE WITH FIVE WINDINGS THEREON

Filed Oct. 13, 1961

INVENTOR
Robert E. Noll
BY Ernest P. Klipfel
ATTORNEY

United States Patent Office 3,165,642

Patented Jan. 12, 1965

3,165,642

ACTIVE ELEMENT WORD DRIVER USING SATURABLE CORE WITH FIVE WINDINGS THEREON

Robert E. Noll, Lutherville, Md., assignor to Westinghouse Electric Corporation, East Pittsburgh, Pa., a corporation of Pennsylvania Filed Oct. 13, 1961, Ser. No. 144,894

8 Claims. (Cl. 307—88.5)

This invention relates to improvements in bipolarity current pulse sources and more particularly to an improved bipolarity current pulse source for use in a magnetic core memory.

Advanced high speed magnetic core memories require the use of a device that is capable of delivering high current bipolarity current source pulses. For high speed operation, the rise and fall times of the current pulses must be extremely fast, in the order of 100 millimicroseconds, or less. For maximum reliability of the memory system over a wide ambient temperature range the device must also deliver current pulses of accurate amplitude.

In summary the apparatus of the instant invention employs, in combination, a fast switching square loop ferrite core and a plurality of high frequency, high current transistors, the resulting circuit possessing all of the aforementioned properties.

Accordingly, an object of the invention is to provide a new and improved current pulse source.

Another object is to provide a new and improved current pulse source characterized by very fast rise and fall times, and yet requiring few active and passive circuit elements.

A further object is to provide a new and improved current pulse source especially suitable for use in magnetic core memory devices.

These and further objects will become more clearly apparent after a study of the following specification when read in connection with the accompanying drawings, in which.

Figure 1:
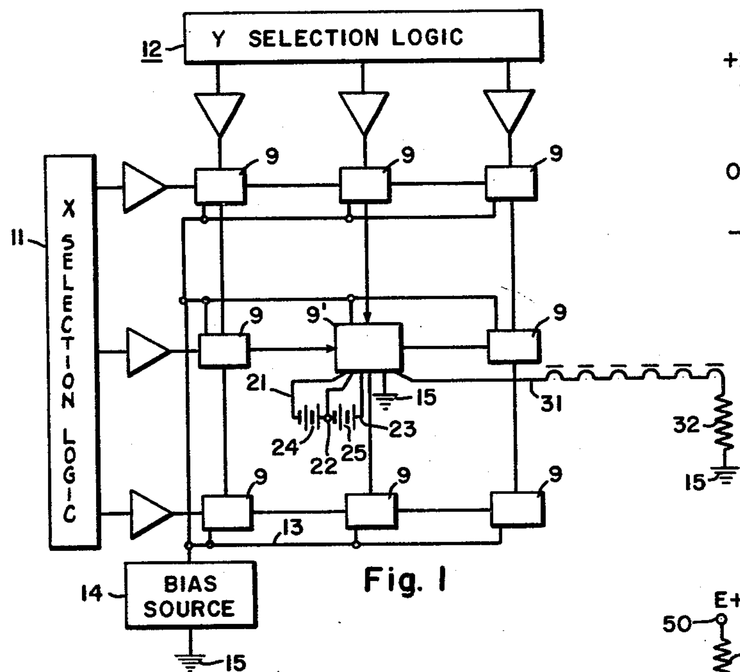
FIGURE 1 is a diagrammatic circuit diagram showing the current pulse source under the control of a pair of selection logic devices for producing full read drive and half write drive pulses of uniform amplitude and fast rise time and showing one application of the invention.
Figure 4:
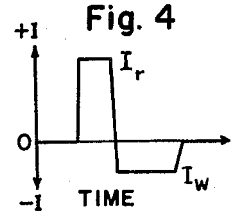
FIG. 4 is a further graph illustrating the operation of the apparatus of FIG. 2.
Figure 2:
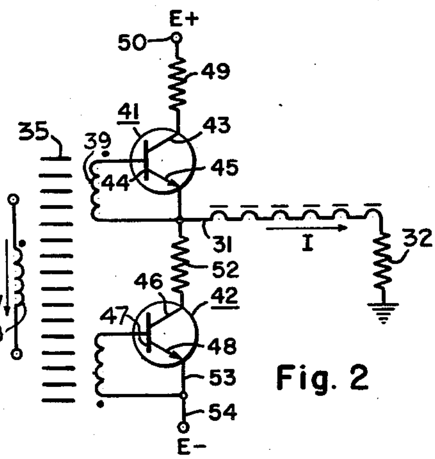
FIG. 2 is an electrical schematic diagram of the current pulse source of the invention in the preferred embodiment thereof.

Referring now to the drawings in which like reference numerals are used throughout to designate like parts for a fuller understanding of the invention and in particular to FIG. 1 thereof there is shown a multi-position access switch embodying a plurality of drivers, being shown by way of example, and designated by the reference numeral 9, all of the drivers being interconnected as shown into a pair of X and Y selection logic circuits designated 11 and 12. All of the drivers 9 have lead means 13 connected thereto for applying a direct current biasing potential to one winding, not shown in FIG. 1, of the winding, the bias for convenience being designated 14 and being shown as applied with the reference to ground 15. In FIG. 2 the bias winding is shown at 16 and has one terminal 17 thereof connected to the aforementioned lead 13 the other terminal 18 being connected in any suitable manner to complete the biasing circuit. While the present biasing circuit has been illustrated to be parallel in nature it is to be understood that a series circuit combination of the bias windings may be utilized when desired. The selected driver 9′, the circuit of which is shown in FIG. 2, is shown somewhat larger in FIG. 1, and in addition to the biasing lead 13 and the ground connection to ground 15 it is seen to have three leads 21, 22 and 23 connecting to two sources of direct current potential or a tapped source of direct current potential 24 and 25 for providing the +E and −E voltages for connection to terminals 50 and 54 respectively in FIG. 2. Lead 22 is connected to ground 15. The pulse output of the selected driver 9′ having the circuit of FIG. 2 is delivered to lead 31 which is connected by way of resistor 32 to ground 15. Resistor 32 may have a small value and may be a load resistor or a sensing resistor or may provide a testing voltage for testing the apparatus and insuring that it is operating satisfactorily. The waveform of the pulse output on lead 31 is shown in FIG. 4, to be presently described in greater detail.

Particular reference is made now to FIG. 2. The driver 9′ includes a toroid core designated as numeral 35 and is composed of square loop material such for example as that having a B-H characteristic illustrated in FIG. 3. The core 35 has five windings inductively coupled thereto or thereon including the aforementioned bias winding 16. In addition to the bias winding 16 are X and Y windings 37 and 38 energized by means under the control of the aforementioned selection logic circuit 11 and 12. A pair of preferably similar high current, high frequency transistors 41 and 42 are shown, transistor 41 having collector 43, base 44 and emitter 45, and transistor 42 having collector 46, base 47 and emitter 48. The collector 43 is connected by way of read resistor 49 to terminal 50 which in this case is shown connected to the positive terminal of the aforementioned source of potential 25 since by way of illustration NPN transistors are shown at 41 and 42. The aforementioned emitter 45 of transistor 41 is connected by way of lead 31 and write resistor 52 to the aforementioned collector 46 of transistor 42, and the aforementioned emitter 48 of transistor 42 is connected by way of lead 53 to terminal 54 which is connected to the negative terminal of source of potential 24 by way of lead 21, FIG. 1. Winding 39 coupled to core 35 has one terminal thereof connected to the base 44 of transistor 41 and the other terminal thereof connected to the aforementioned lead 31 and emitter 45. Winding 40 inductively coupled to core 35 has one terminal thereof connected to the base 47 of transistor 42 and has the other terminal thereof connected to the aforementioned lead 53 and emitter 48 of transistor 42. It will be readily understood that the windings 16, 37, 38, 39 and 40 are wound in chosen directions with respect to each other to provide correct polarities for proper operation of the circuit, as indicated by the well known dot polarity convention.

As previously stated, the invention is a circuit for delivering a bipolarity current pulse for use in magnetic core memories; whereas the device is shown in a specific use, it will be understood that the device or circuit of the invention has other applications. The need for a random access multiposition switch that delivers high current driving fields for magnetic cores is well known to those working in the computer art. A block diagram of a representative switch is shown in FIG. 1; the X and Y selection logic selects the driver, the driver in turn imports a full read drive and a half write drive along the word axis this current waveform through the core line being shown in FIG. 4.

Figure 3:
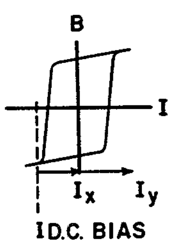
FIG. 3 is a graph illustrating the operation of the square loop magnetic core of FIG. 2 and FIG. 5.

The operation of the circuit will be described with particular reference to FIG. 2, and also the graphs of FIG. 3 and FIG. 4. The square loop ferrite core 35 is direct current biased at a point where two half select drives $I_x$ and $I_y$ must be present in order to fully switch the biased core. These half select drives are preferably square pulses of equal amplitude and must occur simultaneously. When the core 35 commences switching, the base of transistor 41 goes positive with respect to the emitter 45, and the transistor 41 is driven into saturation. The base of transistor 42 is concurrently driven negative with respect to the emitter 48 which drives transistor 42 further into cutoff. When the X and Y drives decay, that is, when the amplitude of the pulses fall to zero, or start falling to zero, the bias current through the core 35 resets the core and the voltages across windings 39 and 40 reverse from their previous state. The base of transistor 42 goes positive with respect to the emitter and thus transistor 42 is driven into saturation. The base of transistor 41 is simultaneously driven negative with respect to the emitter 45 thereof, and thus transistor 41 is turned off extremely fast due to this back biasing action. The amplitude of the write driving field is accurately controlled because of the series combination of the write resistor 52 and the saturation resistance of transistor 42, the saturation resistance of transistor 42 being typically 20 times less than resistor 52.

Transistor 42, which is the write drive transistor, is driven into saturation, therefore the write drive current can be accurately maintained by the magnitude of resistor 52. Typical values of read current rise time is 650 milliamperes in 100 millimicroseconds, and the combination of read fall time and write rise time is 1 ampere in 50 to 100 millimicroseconds. The read pulse is shown in FIG. 4, and is designated $I_r$ whereas the write pulse is shown in the same figure and designated $I_w$.

There has been provided then in FIG. 2 apparatus well suited to accomplish the aforedescribed objects of the invention which are to provide current pulses for reading and writing, of accurately maintained amplitude, and very fast rise and fall time.

Figure 5:
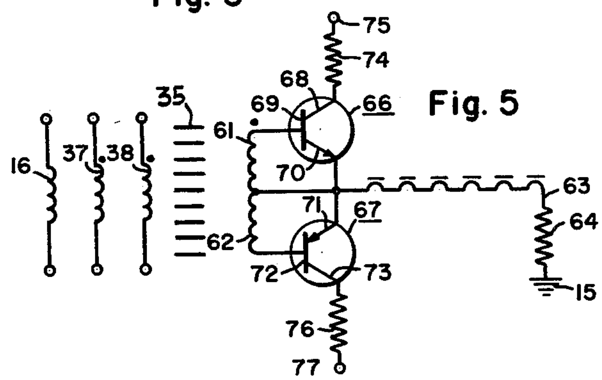
FIG. 5 is an electrical circuit diagram of a second embodiment of the invention.

Particular reference is made now to FIG. 5, in which a second embodiment of the invention is shown. A toroid core 35 has the aforementioned bias winding 16 and X and Y windings 37 and 38 connected as before. Two additional windings inductively coupled to core 35 in FIG. 5 are designated 61 and 62. One terminal of each of the windings 61 and 62 is connected together and to lead 63 which is connected by way of load resistor 64 to ground 15. A pair of dissimilar transistors 66 and 67 are provided as shown, transistor 66 being shown as an NPN transistor and having collector 68, base 69, and emitter 70, emitter 70 being connected to the aforementioned lead 63; and transistor 67 being shown as of the PNP type and having emitter 71, base 72, and collector 73. The collector 68 of transistor 66 is connected by way of resistor 74 to terminal 75, and the collector 73 of transistor 67, is connected by way of resistor 76 to terminal 77. Terminals 75 and 77 correspond to terminals 50 and 54 of FIG. 2 and are connected to suitable sources of direct current potential.

The operation of the circuit of FIG. 5 is similar to that of FIG. 2, FIG. 5 providing a complementary symmetry configuration.

In summary, the circuit of the instant invention employs the unique combination of a square loop ferrite core with a pair of interconnected transistors to produce high speed bipolarity current pulses of accurate amplitude suitable for use in advanced magnetic core memories.

Whereas the invention has been shown and described with respect to some embodiments thereof which give satisfactory results, it should be understood that changes may be made and equivalents substituted without departing from the spirit and scope of the invention.

I claim as my invention:

1. A driving circuit comprising, in combination, means forming a square loop ferrite core, a bias winding inductively coupled to said core, means connected to the bias winding for energizing the bias winding, a pair of switching windings inductively coupled to said core, circuit means operatively connected to the pair of switching windings for providing an X and Y drive to energize the switching windings and cause the core to commence switching, a read winding and a write winding inductively coupled to said core, first transistor means connected to the read winding, second transistor means connected to the write winding, output lead means operatively connected to the first transistor means and to the second transistor means, circuit means including resistor means for energizing the first and second transistor means, the base of the first transistor means going positive when said core commences switching with respect to the emitter and driving the first transistor into saturation, the base of the second transistor concurrently being driven negative with respect to the emitter of the second transistor and driving the second transistor further into cutoff, the bias current in the bias winding resetting the core when the X and Y drives decay, the voltages across the write winding and the read winding reversing from their previous state when the core is reset, the base of the second transistor going positive with respect to the emitter and driving the second transistor into saturation, the base of the first transistor simultaneously being driven negative with respect to the emitter of the first transistor turning off the first transistor.

2. A current pulse generating circuit comprising, in combination, a magnetic core, means operatively connected to the core for biasing the core, circuit means operatively connected to the core for switching the core, said circuit means being adapted to have switching pulses of predetermined amplitude and shape applied thereto, read winding means and write winding means inductively coupled to said core, first and second transistor means output lead means operatively connected to said first and second transistor means, said first transistor means including energizing means connected to the read winding and adapted to produce a current pulse in the output lead means when the core is switched by the switching pulses, said second transistor means including energizing means connected to the write winding and to the output lead means, said second transistor means being driven into cutoff when the core is switched, said core being reset by the fall of the switching pulses, said second transistor thereafter generating a current pulse in the output means, said first transistor being driven to cutoff upon the resetting of said core.

3. A current pulse source comprising, in combination, a core of magnetizable material, means including winding means inductively coupled to said core for switching said core and resetting said core, read means including a first resistor, a first transistor and a read winding inductively coupled to said core for producing a read pulse of predetermined amplitude and polarity when the core is switched, and write means including a second resistor, a write winding and a second transistor inductively coupled to said core for producing a write current pulse of predetermined amplitude and opposite polarity when said core is reset, said first and second resistors having different values chosen such that said read pulse has a greater amplitude than said write pulse.

4. A current pulse source comprising, in combination, a core of magnetic material, means including a bias winding inductively coupled to said core for biasing said core, means including a pair of switching windings inductively coupled to said core for switching said core at the beginning of a pair of simultaneous switching pulses and resetting said core when said pair of switching pulses decay, a first and second transistor, an output lead having one end operatively connected to said first and second transistors and resistance means operatively connected to the other end thereof, read means including said first transistor and a read winding inductively coupled to said core for producing in said output lead a read current pulse of predetermined amplitude when the core is switched, and write means including a write winding inductively coupled to said core and said second transistor connected to the output lead for producing in the output lead a write current pulse of predetermined amplitude when said core is reset.

5. A current pulse source adapted to produce current pulses of one polarity upon the application of a control signal and to produce current pulses of the other polarity when the control signal decays comprising, in combination, magnetic core means having the control signal applied thereto, said magnetic core means being switched by the control signal and being reset when the control signal decays, output lead means, a read winding inductively coupled to said core, a first transistor including energizing means connected to the read winding, the base of the first transistor going positive with respect to the emitter thereof and driving the first transistor into saturation when the core commences switching, the driving of the first transistor into saturation causing a large current to flow in the output lead means, a write winding inductively coupled to said core, second transistor means including energizing means connected to the write winding and to the output lead means, the second transistor means being driven to saturation when the core switches, the core being reset when the switching signal decays, the potentials in the read winding and the write windings reversing in polarity, the first transistor being driven to cutoff and the second transistor being driven to saturation whereby a second current pulse is produced in the output lead means, the first transistor means and the second transistor means including first and second resistor means for limiting the first and second current pulses to predetermined amplitudes.

6. A current pulse source comprising, in combination, a core of magnetic material, means inductively coupled to the core for switching the core and resetting the core, output means, read means inductively coupled to the core, and including first resistor means, for producing a current pulse of predetermined polarity in the output means when the core is switched from one condition to another and having a first amplitude governed by said first resistor means, and write means inductively coupled to said core, and including second resistor means, and operatively connected to the output means for producing a write pulse of opposite polarity in the output means when the core is switched or reset to the other condition and having a second amplitude governed by said second resistor means, said first and second resistor means having different values and chosen such that said first amplitude is greater than said second amplitude.

7. Apparatus according to claim 6 including in addition bias means inductively coupled to the core means.

8. A current pulse source comprising, in combination, a square loop ferrite core, a bias winding inductively coupled to the core, energizing means for the bias winding, first and second switching windings inductively coupled to the core, said first and second switching windings being adapted to be simultaneously energized by switching pulses of predetermined shape and amplitude, said core being switched from a first condition to a reset condition by said pulses, a read winding inductively coupled to said core, a first transistor, said first transistor having a collector, base and emitter, said read winding being connected across the base and emitter, output lead means connected to said emitter, a source of potential, resistor means connecting said source of potential across said collector and output lead means, a write winding inductively coupled to said core, a second transistor having a collector, base and emitter, said write winding being connected across the base and emitter of the second transistor, the emitter of the second transistor being connected to a source of potential, and circuit means including other resistor means connecting the collector of the second transistor to the output lead means, the first transistor being driven to saturation and the second transistor being cut off by the switching of the core and producing a current pulse of one polarity in the lead means, the second transistor being driven to saturation and the first transistor being cut off upon the resetting of said core as the control pulses decay thereby producing a current pulse of the other polarity in said lead means.

References Cited in the file of this patent

UNITED STATES PATENTS

| | | |
|---|---|---|
| 2,864,961 | Lohman et al. | Dec. 16, 1958 |
| 2,938,129 | House | May 24, 1960 |
| 3,007,056 | Logue et al. | Oct. 31, 1961 |
| 3,009,070 | Barnes | Nov. 14, 1961 |
| 3,033,997 | Salihi | May 8, 1962 |
| 3,076,181 | Newhouse et al. | Jan. 29, 1963 |
| 3,077,545 | Rywak | Feb. 12, 1963 |

FOREIGN PATENTS

| | | |
|---|---|---|
| 766,868 | Great Britain | Jan. 23, 1957 |